June 30, 1925.
K. W. PETERSON
ROLLER OR BALL BEARING
Filed Jan. 22, 1921
1,544,176
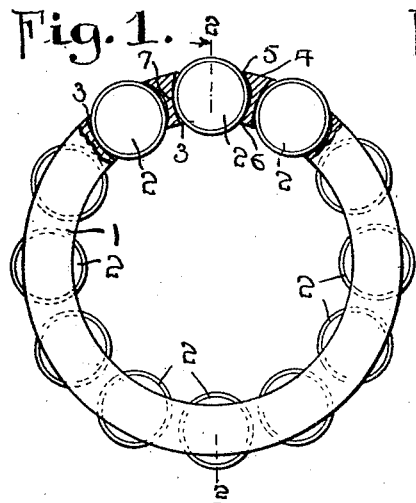
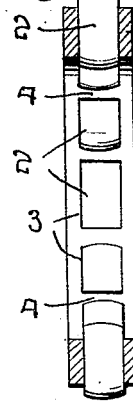
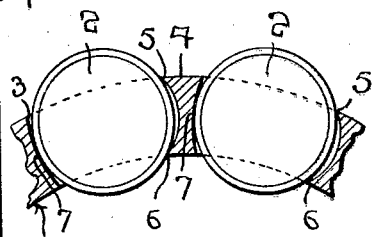
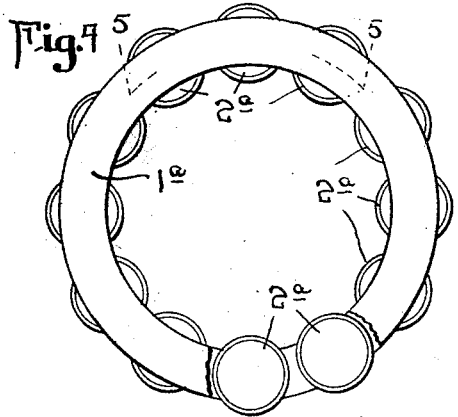
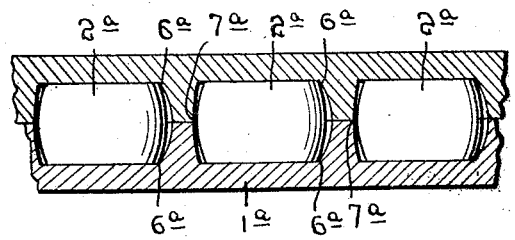
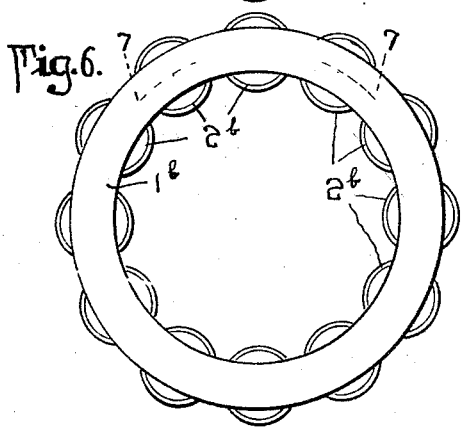
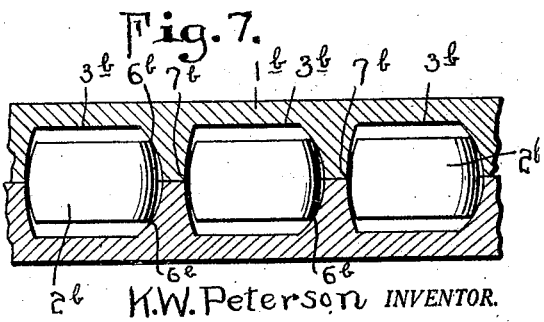
K. W. Peterson INVENTOR.
BY Marks & Clerk
ATTORNEYS.

Patented June 30, 1925.

1,544,176

UNITED STATES PATENT OFFICE.

KARL WILHELM PETERSON, OF GOTTENBURG, SWEDEN, ASSIGNOR, BY MESNE ASSIGNMENTS, TO NYA NORDISKA KULLAGER AKTIEBOLAGET, OF GOTTENBURG, SWEDEN.

ROLLER OR BALL BEARING.

Application filed January 22, 1921. Serial No. 439,163.

*To all whom it may concern:*

Be it known that I, KARL WILHELM PETERSON, a subject of the King of Sweden, residing at Gottenburg, in the county of Goteborg and Bohus and Kingdom of Sweden, have invented new and useful Improvements in Roller or Ball Bearings, of which the following is a specification.

This invention relates to antifriction roller or ball bearings, more especially to such roller or ball bearings, which are provided with solid cages, and has for its object to provide a roller or ball cage with recesses for the rollers or balls of such a shape that the partition members of the cage between the rollers or balls become more or less resilient.

According to this invention the said result is obtained by providing recesses of such a form, that on the one contact surface of the said partition members of the cage, one or more points touch the corresponding roller or ball, and on the other contact surface of the same partition member one or more points displaced in relation to those previously mentioned touch the adjacent roller or ball so that the connecting line between two such contact points, located on opposite contact surfaces, will not coincide or be parallel with the line indicating the direction of movement of the rolling bodies. This relative displacement of the respective contact points makes it possible for the partition members of the cage to yield when a pressure is applied upon them from the rollers or balls when operative.

The invention will now be described with reference to the accompanying drawings which illustrate diagrammatically various forms of roller bearings constructed in accordance with the invention wherein;

Figure 1 is an elevation of the improved bearing, a portion of the cage being broken away and shown in section.

Figure 2 is a section on the line 2—2 of Figure 1.

Figure 3 is an enlarged fragmentary section taken in a plane corresponding to the plane in which the sectional portion of Figure 1 is taken.

Figure 4 is an elevation of a modified form of the bearing, a portion of one part of the cage being broken away.

Figure 5 is an enlarged sectional view on the line 5—5 of Figure 4, the rollers being shown in elevation.

Figure 6 is a side elevation of a further modified form of the invention.

Figure 7 is an enlarged sectional view on the line 7—7 of Figure 6, the rollers being shown in elevation.

1 denotes the cage, 2 the rollers, 3 the recesses in the cage for the rollers, 4 the partition members of the cage, 5 and 6 denote points of contact between the rollers 2 and the partition members 4 on the one side of the partition member, and 7 is a single contact point on the other side of a partition member 4, which point is displaced in relation to and disposed centrally therebetween the points 5 and 6.

From the figures it will be clear that when for some reason during the operation of the bearing, one or more of the rollers 2 lag behind, a pressure will result upon the points 5 and 6 of the partition members 4 of the cage. If the recesses 3 in the roller cages are formed in such a way, that the pressure from a roller 2 on the left hand side of a partition member 4 is directed through the points 5 and 6 and the pressure from a roller 2 on the right hand side of the same member 4 is directed through the point 7, the result will be a tendency to flex the partition member with the consequent yielding of the latter.

In Figure 1 the displacements of the contact points 5, 6 and 7 are provided for in planes extending radially of the axis of the bearing, while in Figure 2 said displacements are arranged in an axial direction. Referring more particularly to the form of the invention illustrated in Figure 2, the cage is indicated at 1ᵃ, the bearing rollers at 2ᵃ and the two points of contact between one side of each partition and an adjacent roller 2ᵃ at 6ᵃ. The opposite side of said partition which engages an adjacent roller is in contact therewith at only one point designated 7ᵃ. There is no reason why the devices shown in Figure 1 and Figure 2 should not be combined to obtain a still better effect.

In Figure 3 the recesses 3ᵇ in the cage 1ᵇ are wider than the rollers 2ᵇ, thus eliminating friction upon the flat side surfaces of the rollers. In this case the rollers when tending to move out of their regular position will easily be brought back by the pressure from the contact points 6ᵇ and 7ᵇ. This last mentioned feature can be combined with the device shown in Figure 1.

This invention relates not only to roller bearings but to ball bearings or the like.

What I claim is:—

1. A cage for anti-friction roller members having recesses for the rolling members and partition members for spacing the roller members, each partition member being so shaped that the rolling member on one side has contact therewith at a plurality of points, whereas the rolling member at the opposite side has contact at a point intermediate the points of contact on the first mentioned side whereby the portion of the partition member lying between the points of contact is flexed upon application of pressure to the rolling members.

2. A cage for anti-friction rolling members having recesses for the rolling members and partition members for spacing the rolling members, each partition member being so shaped that the rolling members on both sides have contact therewith at one or more points whereby each line connecting any contact point in one contact surface with any one of the contact points located on the opposite contact surface of the same partition member will be obliquely disposed with relation to the line indicating the direction of movement of the rolling member so that the partition member will be flexed upon application of pressure to the rolling member.

In testimony whereof I have affixed my signature.

KARL WILHELM PETERSON.